(12) United States Patent
Ahlström

(10) Patent No.: US 6,712,980 B1
(45) Date of Patent: Mar. 30, 2004

(54) DEVICE AND METHOD FOR THE TREATMENT OF CONTAMINATED MEDIA

(75) Inventor: Rolf Ahlström, Gävle (SE)

(73) Assignee: Gefle Virvelteknik AB, Gavle (SE)

(*) Notice: Subject to any disclaimer, the term of this patent is extended or adjusted under 35 U.S.C. 154(b) by 0 days.

(21) Appl. No.: 09/889,332
(22) PCT Filed: Jan. 17, 2000
(86) PCT No.: PCT/SE00/00083
§ 371 (c)(1),
(2), (4) Date: Oct. 25, 2001
(87) PCT Pub. No.: WO00/41802
PCT Pub. Date: Jul. 20, 2000

(30) Foreign Application Priority Data

Jan. 15, 1999  (SE) ............................. 9900104

(51) Int. Cl.[7] ................ C02F 3/00; C10J 1/18
(52) U.S. Cl. .............. 210/758; 210/760; 210/629; 261/87; 261/91; 261/93
(58) Field of Search .............. 261/87, 91, 93; 210/758, 760, 629, 620

(56) References Cited

U.S. PATENT DOCUMENTS

| | | | | |
|---|---|---|---|---|
| 3,765,656 A | * | 10/1973 | Tofaute ................ 366/265 |
| 3,982,913 A | * | 9/1976 | Feichtinger ............ 75/708 |
| 4,611,790 A | * | 9/1986 | Otsuka et al. ........... 266/235 |
| 4,863,644 A | * | 9/1989 | Harrington et al. ....... 261/77 |
| 4,925,598 A | * | 5/1990 | Kivisto et al. .......... 261/87 |
| 5,013,490 A | * | 5/1991 | Tanimoto et al. ......... 261/87 |
| 5,244,097 A | * | 9/1993 | Leiponen et al. ........ 209/169 |
| 6,126,150 A | * | 10/2000 | Van Dyk ............... 261/87 |

FOREIGN PATENT DOCUMENTS

| | | |
|---|---|---|
| CA | 1101138 | 5/1981 |
| WO | WO 00/41802 | 7/2000 |

OTHER PUBLICATIONS

International Search Report as Completed by the ISA/SE on May 11, 2000, in connection with Patent Application No. PCT/SE00/00083.

* cited by examiner

*Primary Examiner*—Chester T. Barry
(74) *Attorney, Agent, or Firm*—Jenkens & Gilchrist, P.C.

(57) ABSTRACT

The invention relates to an apparatus for the treatment of contaminated media, comprising a rotatable housing having at least one inlet (28) for gas emerging in the stirrer housing, and at least one suction opening (10; 32) for the medium to be treated. The housing is provided with a plurality of outlet openings (25; 27) arranged along its periphery. A plurality of vanes (22; 23) are arranged in the outlet openings (25; 27). A rotation transferring means (24) is provided to transfer a rotational movement to the stirrer. A method according to the invention comprises generating a vortex in the medium in such a way that an under-pressure occurs in the center of the vortex, and that a nitrogen containing gas is introduced in the center of the vortex.

17 Claims, 5 Drawing Sheets

DEVICE AND METHOD FOR THE TREATMENT OF CONTAMINATED MEDIA

The present invention relates to a device and a method for the treatment of strongly contaminated and nasty smelling media, and whenever applicable, treatment of media with very high contents of bacteria. The invention also relates to the products obtained when performing the method.

BACKGROUND OF THE INVENTION AND PRIOR ART

In many fields nasty smelling and strongly contaminated media are produced. In the field of animal breeding manure is produced which releases large amounts of ammonia, which constitutes an environmental drawback for the near surroundings, but also for the environment as a whole. The bacteria contents can also be high, and direct contact with the manure can be extremely hazardous to the health.

Waste water arriving at sewage treatment plants in the form of a sludge having a high content of bacteria is also highly nasty smelling and must be taken care of in an environmentally friendly way. In larger sewage treatment plants sludge has traditionally been taken care of for the digestion thereof, in order to extract gas and killed bacteria, however, this is a laborious operation requiring large plants and much time. For smaller sewage treatment plants it is common to transport the sludge to plants having a treatment facility. It is also common to deposit the sludge at waste stations.

Regarding manure it is desirable to prevent ammonium from being released in the form of ammonia. This can be achieved by oxygenating the manure thereby producing a conversion of $NH_{4+}$-ions to $NO_{3-}$-ions. One way of achieving this is to blow air through the medium by using compressors. However, this method is inefficient. The energy consumption is considerable and therefore the cost becomes high.

The sanitation aspect, i.e. the elimination of *E. Coli* from waste sludge and water has become increasingly important, and is to a great extent a problem.

A previously known device intended for the oxygenating of water having relatively low concentrations of solid compounds, i.e. not a sludge, is known from SE-460 706 and SE-500 416 respectively.

Canadian patent 1101138 discloses submerged turbine aeration apparatus. It comprises a hollow rotatable shaft, an intake for gas near the top end of the shaft, an outlet for gas near the bottom end of the shaft, and an impeller connected to the shaft. The impeller comprises two spaced-apart discs with a plurality of vane elements therebetween and an intake for liquid comprising an aperture adjacent the shaft for admitting the liquid. The impeller draws liquid through the aperture past the gas outlet, for mixing the liquid with the gas, and expels the liquid outwardly from the vane elements as the impeller rotates.

Although this device is usable for aeration of liquids, it cannot generate very high vortexes inside the impeller, because there is simply not enough space available.

Other examples of devices intended for oxygenating of liquids in various connections are known from e.g. U.S. Pat. Nos. 5,275,762; 5,045,202; 4,442,045; WO 96/09989; WO 97/18168 and FR-2 277 044.

However, none of these devices anticipates the present invention.

SUMMARY OF THE INVENTION

Thus, there is a need to more efficiently take care of strongly contaminated and nasty smelling media that are formed e.g. in sewage treatment plants, e.g. raw sludge, and in animal breeding, e.g. pigs manure. Waste products from butcheries and garden waste materials such as composting waste material need to be taken care of in an efficient way.

The object of the invention is therefore to provide systems, devices and methods to achieve this.

This object is achieved in accordance with one aspect of the invention with the device according to claim 1. With this device, that can be said to constitute complex stirrer, a very efficient oxygenation of the contaminated medium is achieved, which contributes to nitrification processes occurring very rapidly. In addition a cavitation is created in the medium, which brings about a temperature increase, which also contributes to a very high killing of bacteria.

A substantial reduction in the BOD values have been noted, and oxygenation is very efficient in relation to the energy consumption when running the apparatus according to the invention.

It has also been noted that there are no losses of nitrogen, and certain indications point to the fact that the total nitrogen contents even increases in e.g. manure material, by treating media with the device and method according to the invention. Thus, the raw material is "refined" by performing the method according to the invention.

When performing the method according to the invention, which is defined in claim 9, a product is obtained in the form of a sludge which is virtually freed from bacteria, which has a certain concentration of nitrates and phosphorous, and which is particularly suitable as nutrition for forests and fields, plantations etc.

This sludge is very easy sedimentable such that supernatant with high concentrations of nitrate and a very compact sedimented rest is formed. This rest is excellent as earth improver and as a fertiliser. The supernatant can also be used for fertilising, e.g. for energy forests, nursery gardens, market gardens, city plantations etc.

The Invention will now be further illustrated with reference to the attached drawings wherein FIG. 1 shows the stirrer according to the invention in a perspective view;

DETAILED DESCRIPTION OF THE INVENTION

Figure 1:
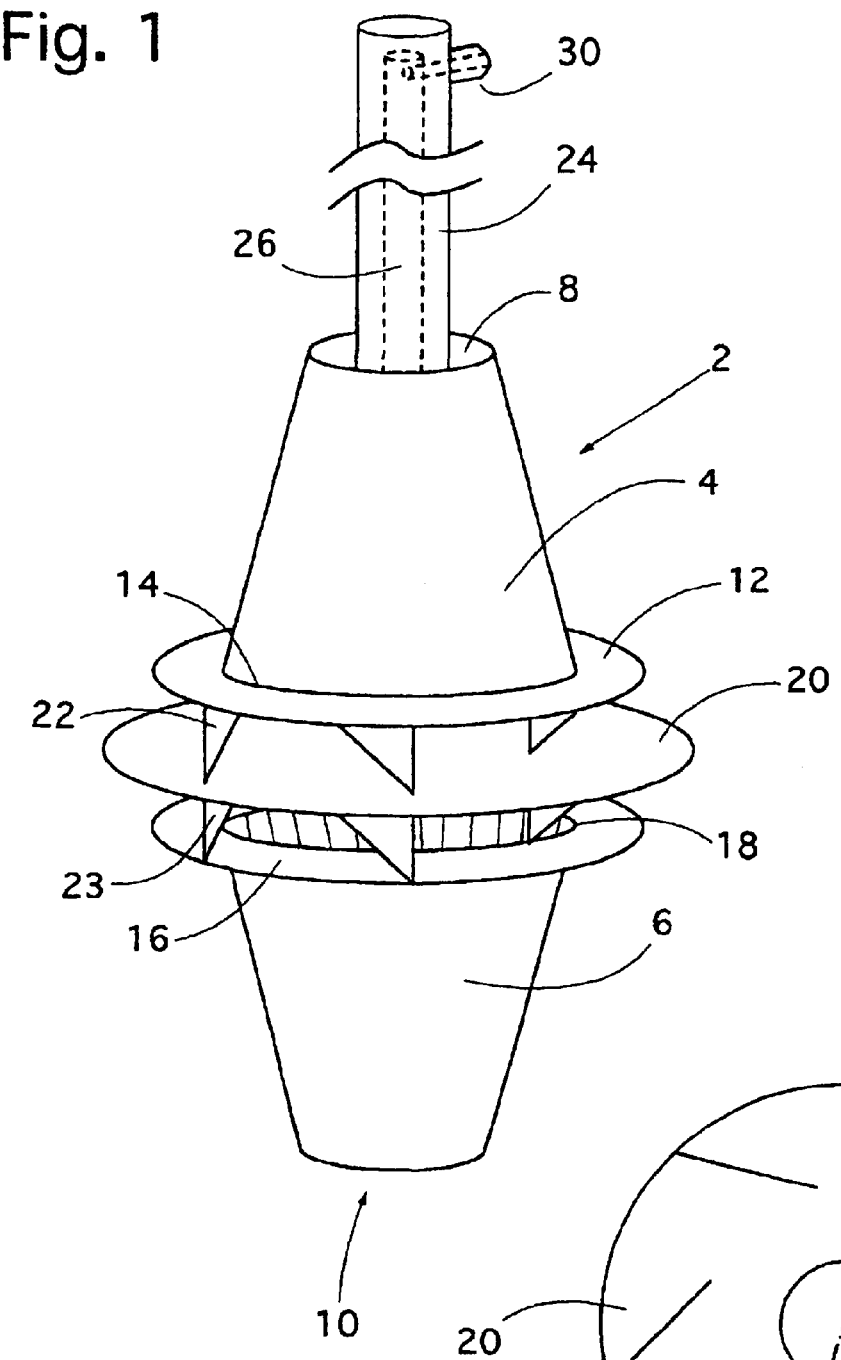

The embodiment of a Stirrer according to the invention shown in FIG. 1, and generally designated 2 in FIG. 1, comprises a stirrer housing. The housing in its turn comprises a first upper sheath 4 and a second lower sheath 6. The sheaths 4, 6 are essentially shaped as truncated cones, such that instead of a cone apex there are openings 8, 10 facing upwards and downwards respectively. By making the upper and lower compartments of the stirrer as a double cone, the volume in each compartment will be large enough to enable the strong vortex, required for the effect according to the invention to take place.

The first (upper in the figure) sheath 4 has a flange or collar 12 running around its base 14. Correspondingly the second (lower in the figure) sheath 6 has a flange or collar 16 running around its base 18. Between both sheath units 4, 6 there is a circular plate 20 provided. The plate 20 is rigidly joined to respective sheath unit 4, 6 by way of upper vanes 22 provided on the upper side, and lower vanes 23 provided on the lower side of the plate 20. These vanes 22, 23 are arranged such that they extend from the periphery and a distance inwards towards the centre of the stirrer. However, they form an angle α together with an imagined line running from the point of attachment for respective vane and through the centre of the entire unit. This is most clearly evident from FIG. 2, which separately shows the circular plate 20 comprising the upper vanes 22, seen from above. Between vanes 22, 23 there are formed upper outlet apertures 25 and lower outlet apertures. This part of the stirrer 10 will be referred to below as its "waist".

By this design the stirrer has two separate compartments, an upper compartment 5 and a lower compartment 7, the significance of which will be further illustrated with reference to the description of function below.

The length of the vanes 22, 23 is not critical, and can vary, but should preferably amount to between 20 and 70% of the diameter, calculated from the outer point of attachment of the vanes along the periphery of the plate 20. Also the number of vanes is not critical but a suitable number of vanes should be 2–15, preferably 5–10. The angle α is not particularly critical but should amount to 30–70°, and preferably it should be between 35 and 50° C.

A shaft is provided centrally and in axial direction. The shaft runs through the plate 20, and its end surface 21 is situated in essentially the same plane as the lower edge of the lower vanes 23, or expressed differently in the same plane as the flange 16 belonging to the lower sheath 6. The shaft 24 has a central air channel 26 emerging in a hole 28 on the underside (as seen in the figures) of the plate 20. See in particular FIG. 3. The shaft 24 is connected to a drive unit (not shown) to provide rotation, e.g. an electric motor. The other upper end of the air channel is closed. However, on the shaft there is provided a throttle valve 30. With this valve 30 the supply of air during operation can be varied, which will be described more closely below. As shown in the figures, the shaft 24 can extend past the plate 20 to a level equal to the lower edges of the vanes 23. This configuration is suitable for the treatment of e.g. manure. Namely, because of the high viscosity thereof the material would not be able to reach higher, e.g. up to the bottom side of the plate 20. However, for lower viscosity media, such as waste water, it is conceivable to attach the shaft 24 directly onto the plate 20, and just make a hole in said plate 20, having a diameter corresponding to the diameter of bore or air channel 26 in the shaft 24.

The shaft 24 protrudes through the upper opening 8 of the upper sheath unit 4, such that an annular gap 32 is formed around the shaft 24. The annular gap 32 and the opening 10 serve as an inlet for flowing medium during operation of the device, which will be further illustrated below.

Figure 2:
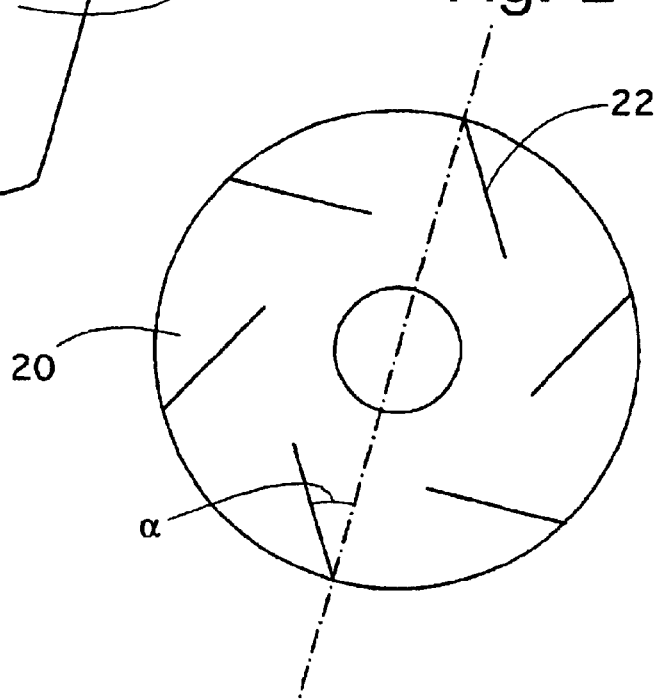
FIG. 2 shows a view from above with the upper part of the stirrer taken away.
Figure 3:
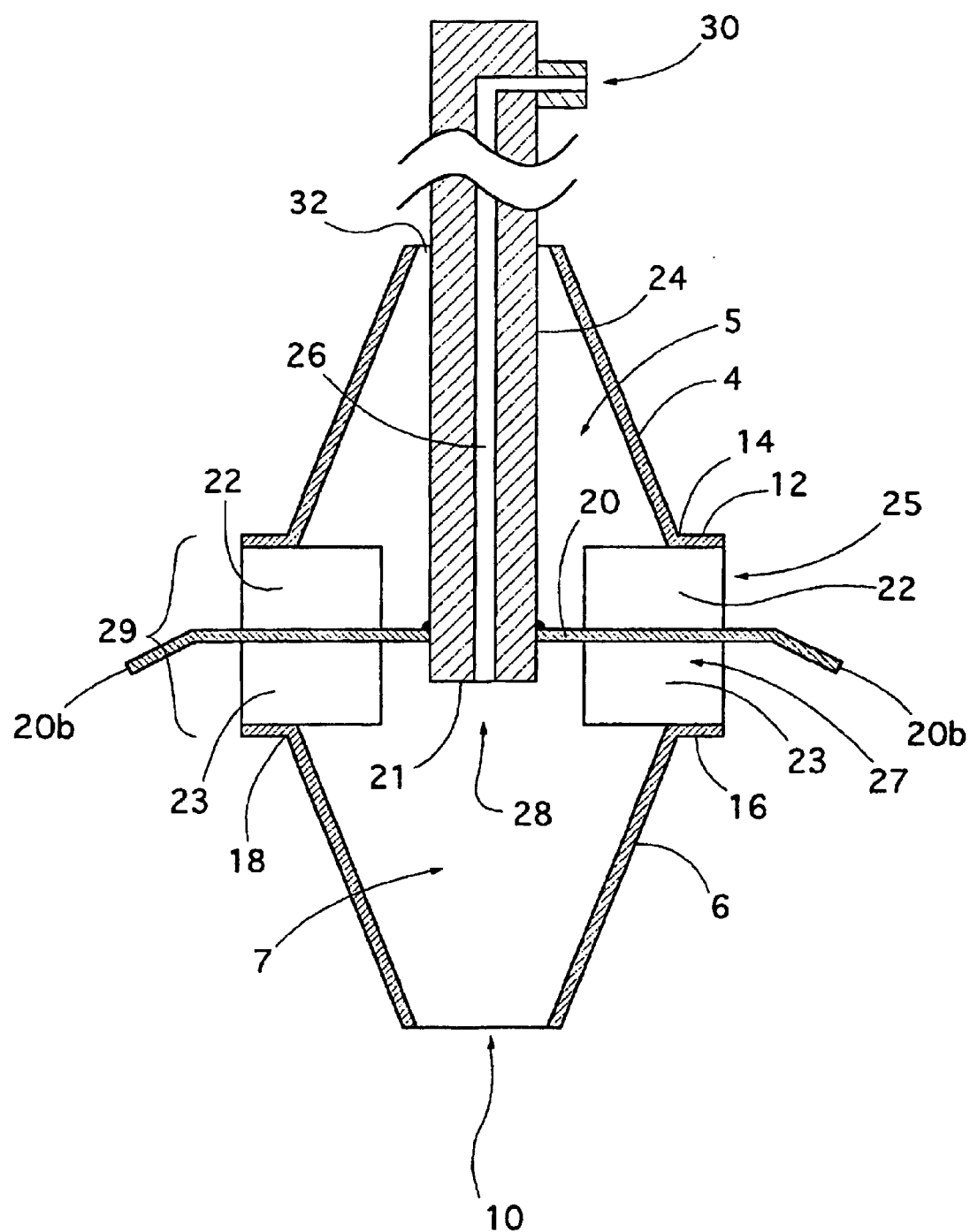
FIG. 3 shows a preferred embodiment of the stirrer according to the invention in cross section.

The embodiment shown in FIGS. 1–3 is a preferred variant, in that it performs dual functions. The upper compartment and the air entering therein primarily contributes to oxygenation, while the lower compartments contributes to the killing of bacteria and nitrification.

In a further embodiment of the design according to FIG. 3, the circular plate 20, separating the upper and lower compartments 5 and 7 respectively, is provided with a deflection collar 20b, forming an angle of about 30° (the angle is not strictly critical) with the plane of said plate 20. This angled deflection collar serves to dieflect the medium expelled from the lower compartment 7 downwards. This enhances the circulation of the medium inside the vessel significantly, and avoids gas from escaping upwards and into the atmosphere. In fact, the strong vortex in the vessel and the downward movement of the expelled medium combine to make the expelled medium quickly reentering the lower compartment through the bottom inlet 10. In order to further enhance the effect of this flow improvement, preferably a vessel is used where the lower portion is cone shaped.

Figure 4:
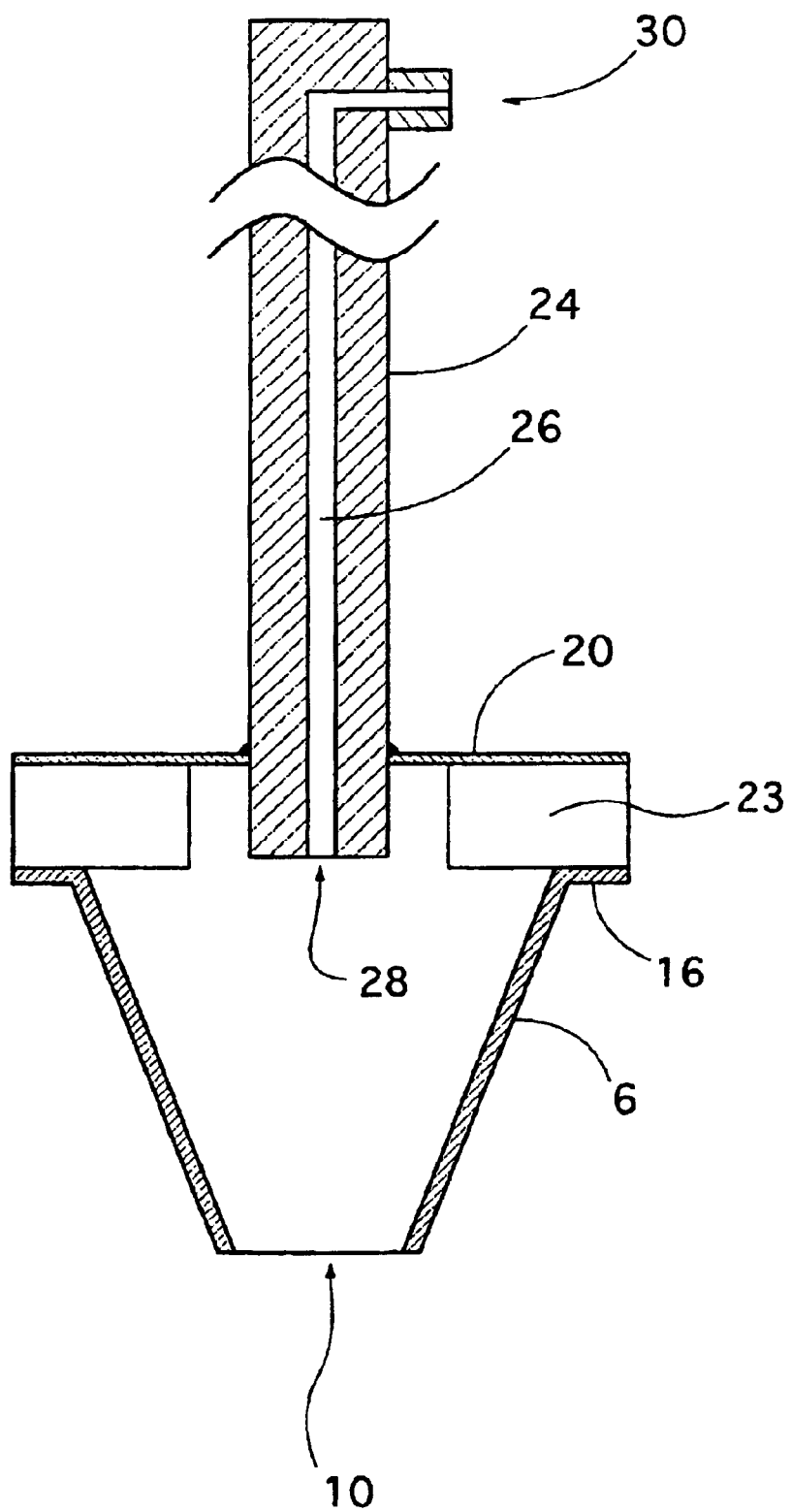
FIG. 4 shows another embodiment of the stirrer according to the invention having only one compartment.

In FIG. 4 there is shown a simpler variant wherein the upper compartment has been removed. In all other respects it is identical with the embodiment shown in FIG.3.

Figure 5:
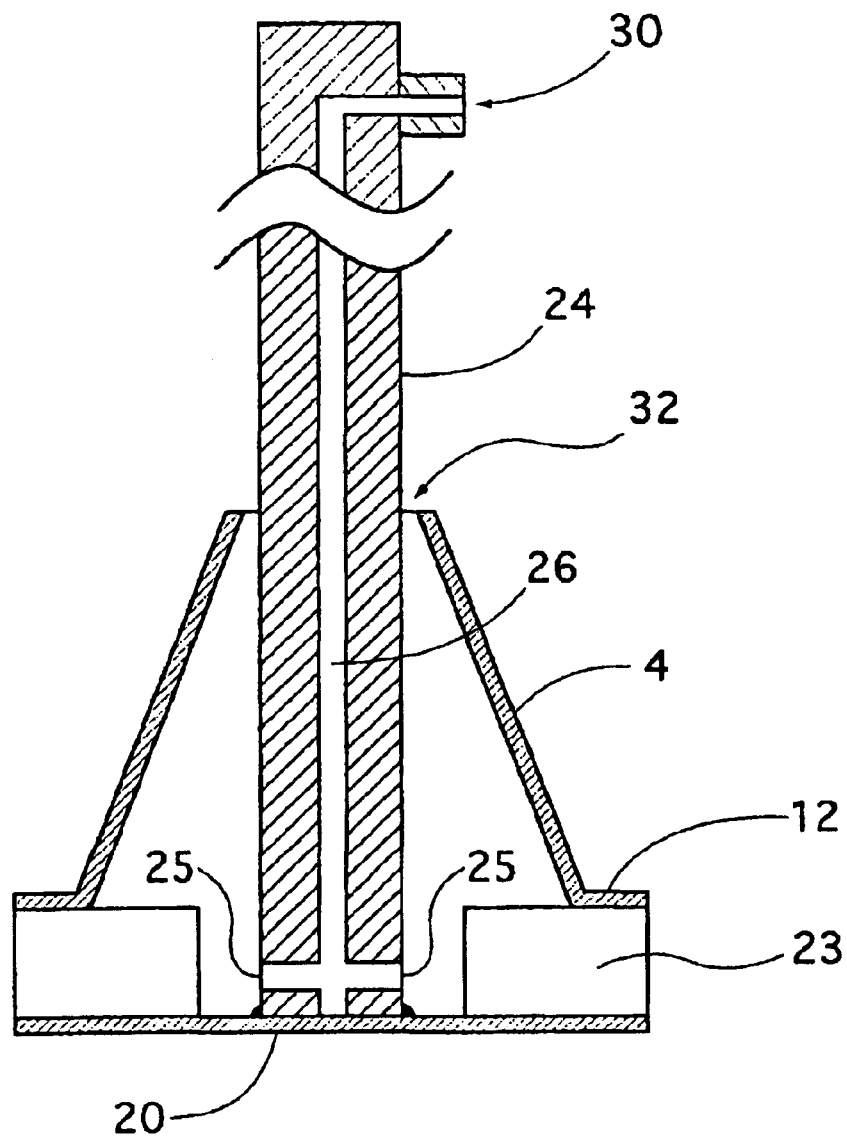
FIG. 5 shows a still further embodiment of the stirrer according to the invention with only one compartment.

In the same way there is shown in FIG. 5, a variant wherein the lower compartment has been removed. For this purpose the shaft 24 is attached e.g. by means of welding in the plate 20, which forms a bottom. Radial holes 28b are bored through to the central air channel 26. In all other respects it is identical to the upper part of the embodiment shown in FIG. 3. This variant can only be used for oxygenation.

Depending on the field of use the stirrer according to the invention can be differently dimensioned. It can be used in relatively small containers of a few hundred liters, up to very large containers of tens of cubic meters and even larger.

Another conceivable field of use is purification/oxygenation of water in lakes, whereby the stirrer could be made very large with a diameter of up to 1 m. Also water in fish breeding facilities could be treated in accordance with the invention.

Other conceivable fields of use are treatment of various types of manure such as manure from pigs and cows. Such manure types often contains straw and therefore need to be pre-treated by some kind of grinding process.

It is further conceivable to treat butchery wastes, leakage water from waste dumps, process waters from industries, waste water from car wash facilities etc.

Still another use of the inventive idea is the removal of metals from waste waters, especially for the enhancement of the sedimentation rate of leachates from waste deposits. It is especially efficient for the improved separation of copper. For this purpose a device according to FIG. 4 is used. It is believed that due to the extreme conditions created inside the stirrer housing, the Cu-microparticles will aggregate to larger assemblies that will sediment at a very much larger rate. It is also possible that colloidal Cu is aggregated, which is a great improvement, since colloidal particles normally will not settle within a reasonable time, if at all, by currently used methods.

The device according to the invention is used in the following way.

A contaminated and possibly nasty smelling medium, e.g. pigs manure or sludge from waste water treatment plants, is placed in a suitably dimensioned tank. The stirrer is lowered down to the level in the tank. The driving motor is initiated and the stirrer is caused to rotate. Depending on the desired effect, the speed of rotation is selected within different ranges.

1: For oxygenation only a speed of rotation is used in the range 800–2800 rpm

2: For treatment of manure 800–1500 rpm

3: For treatment of sludge 800–1500 rpm

When the stirrer begins to rotate the vanes 22 become operative, throwing material outwards from the centre of the stirrer. Thereby material is sucked in trough the opening 10 at the lower end of the stirrer and through the annular gap 32 at its upper end. Since the device rotates, the material that has been sucked in is forced into a vortex type of movement which makes it strive outwards and flow along the inner surfaces of the sheaths 4, 6, and downwards and upwards respectively against the edges 14 and 18 of the sheaths, where it is thrown out from the stirrer by centrifugal force. Because a strong vortex is formed in the medium around the stirrer the liquid level in the vortex will be lowered down to the upper opening of the stirrer. There, air will be sucked in vigorously. At a speed of rotation amounting to 1500 rpm a stirrer according to the invention having a diameter of 15 cm i.e. as it is shown in the figures, sucks in 15–20 $m^3$/h into the medium. This can essentially be varied by proportionally changing the dimension of the device. The oxygen in the air that has been sucked in trough the annular gap will oxygenate the medium and contribute to higher biological activity in the medium, i.e. microbiological decomposition (decay process) is strongly supported.

Figure 6:
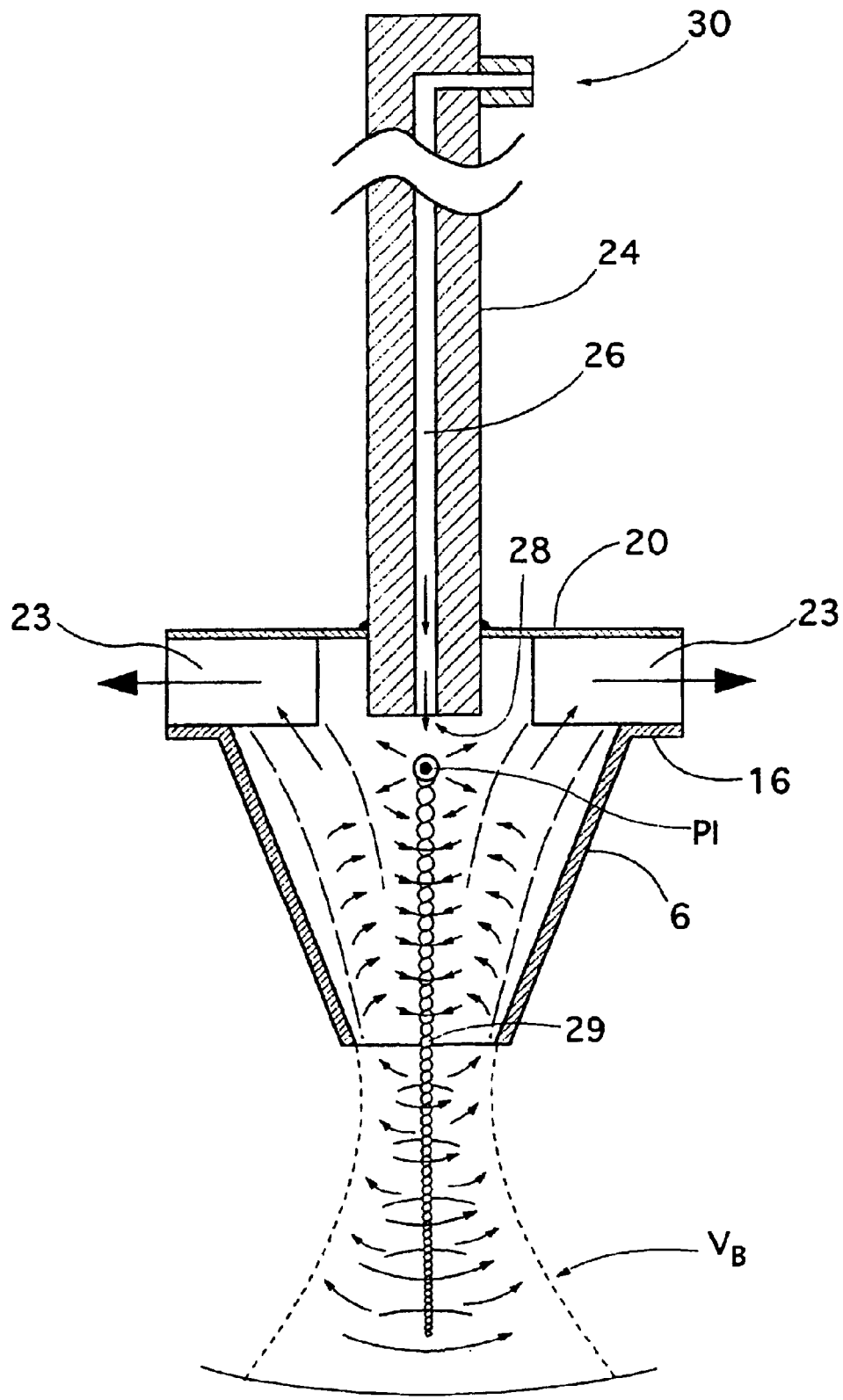
FIG. 6 illustrates schematically the flow pattern in operation of the apparatus according to the invention.

In the same or a corresponding way a strong vortex is formed in the medium above the lower opening 10, see FIG. 6 which schematically shows a set arrows indicating flow pattern vectors . That material will be drawn upwards because the vanes 23 through the material out from the lower compartment 7 and out through the peripheral openings 27 at the waist 29 of the stirrer. This creates a vacuum/under-pressure in the centre of the stirrer. The under-pressure is regulated by adjusting the throttle valve to a suitable extent, and by adapting the speed of rotation in accordance with the viscosity of the medium and its dry matter content. This is done empirically by testing. As can be seen in FIG. 6, the air that is introduced through the inlet 28 forms a very narrow "channel" 29 in the centre of the vortex. Thus, there will be a flow both outwards from the housing through the outlets 23 and an inward flow towards the centre. The gas in the narrow "channel", centrally located in the vortex, will diffuse into the medium and cause oxygenation thereof (if oxygen is present). In particular a point of implosion is formed as indicated at PI in the figure. Below the housing, a further vortex VA is formed, which is clearly visible within boundaries indicated by the dashed lines. The visibility is due to the dispersion of very fine gas bubbles in the medium.

During operation the flow pattern will go through a cycling, the period of which can vary, but with the set up shown in the figures, amounts to about 30 seconds. The cycling can be defined by the movement of the central "air channel" which is formed at the opening 28 and gradually extends downwards, to subsequently reduce its extension and begin to "pull back" towards the opening 28 again.

Without wishing to be bound by any theory for the mechanism we believe that the following takes place in the stirrer.

Air or some other gas that is sucked in to the lower compartment in the stirrer housing through the air channel 26 in the shaft 24, will encounter extreme conditions due to the vacuum prevailing therein. The exact mechanism is not known, but it is believed that the extreme pressure conditions and the cavitation and possibly implosion that takes place in this region, can release nitrogen, if present in the gas, and possibly molecular nitrogen is formed, which can react with the organic material in the medium and form nitrogen compounds. The oxygen or ozone, if present, in the microscopic bubbles that are generated diffuse rapidly into the medium where organic material is oxidised. Aerobic bacteria in the medium will also consume oxygen. In the bubbles, nitrogen will remain which has properties different from those of oxygen. The extreme conditions contribute to the rapid conversion of $NH_{4+}$ ions to $NO_{3-}$ ions. Also it is believed that the cavitation, will cause mechanical damage to the cells and thereby contribute to the killing of the bacteria. The experiments that have been performed have verified very large killing rates of *E. Coli*.

The obtained product, e.g. treated sludge that has been allowed to sediment, is very suitable as earth-improver or manure, since the major part of the phosphorous that is present in the sludge is transferred to the dewatered portion.

The invention will now be closer illustrated with reference to examples, which are not to be regarded as limiting on the scope of the invention.

EXAMPLES

Example 1

Sludge from one of the sewage treatment plant of Gävle kommun was treated for 21 days with a stirrer according to the invention.

Approximately 0.3 $m^3$ sludge was placed in a tank provided with a stirrer according to the invention. The process was run for 7 days without any addition of sludge. This period can be regarded as a "starting period". During this period the rotation of the stirrer was 1500 rpm. In order to simulate the flow in the sewage plant a 10% exchange of sludge everyday was initiated after 12 days.

In table 1 results of chemical and microbiological analysis are shown.

The time sequence of the experiment was the following:

The process was initiated on June 29 and continued until July 6 without any material being exchanged. July 6 the process was stopped and was halted during 5 days, and July 11 it was started again. Thereafter 10% of the sludge was exchanged every day. The processes was terminated July 29.

TABLE 1

| Analysis | unit | June 29 | July 6 | July 11 restart | July 20 |
|---|---|---|---|---|---|
| *E. Coli* | per 100 ml | 22000000 | 34000 | — | 33000 |
| Fecal streptococks | no analysis | | | | |
| Dry matter (DM) | % | 6.1 | 2.8 | — | 3.3 |
| Burning loss | % of DM | 63 | 60.3 | — | 60.4 |
| Total nitrogen | % of DM | 2.5 | 3.7 | — | 4.2 |
| Ammonium nitrogen | % of DM | 0.30 | 0.65 | — | 0.53 |
| COD | mg/l | 22900 | 21900 | — | 24700 |
| BOD | mg/l | 5600 | 850 | — | 2100 |

As can be seen from table 1 an (apparent) increase of the total nitrogen amounting to approximately 70% is noted. This increase can be due to an error in the analysis. Possibly depending on the nitrogen of the raw sludge being bound in a way that the analysis is not capable of identifying.

Further, the very large reduction of *E. Coli* can be noted. The residual content amounted to only about 0.15% of the initial content.

The treated sludge was essentially free from smell after 24 hours. One liter of the sludge was poured in a measuring cylinder, and was allowed to sediment for two days, i.e. until no further sedimentation could be seen. After this time it had sedimented to a very compact caking and a relatively clear supernatant.

In order to render the separation more efficient, sludge was filtrated whereby a caking and a supernatant was obtained. The caking was essentially free from smell (only phosphorous smell) and had the consistency of a compact clay.

The analysis of the supernatant yielded the following results:

| | |
|---|---|
| Phosphate-P | 0.3 mg/l |
| Total-P | 0.9 mg/l |
| Nitrate-N | 147 mg/l |
| Ammonium-N | 8.5 mg/l |
| COD | 280 mg/l |

Analysis of dewatered sludge gave the following result:

| | |
|---|---|
| Dry matter | 9.63% |
| Burning loss | 60.5% of dry matter |

Example 2

Sludge from the same sewage plant as in example 1 has been treated in a further run. The treatment was performed during 72 hours. The treated (stabilised) sludge was dewatered, and thereby one part dewatered sludge and one part almost colourless liquid was obtained. The sludge was essentially free from smell in less than 24 hours.

TABLE 2

| ANALYSIS | unit | Nov. 30 (raw sludge) | Dec 3 (stabilised sludge) |
|---|---|---|---|
| E COLI | per 100 ml | 54 × 109 | 700 000 |
| AMMONIUM-N | % of DM | 0.31 | 0.12 |
| NITRITE | % of DM | 0.004 | 0.08 |
| NITRATE | % of DM | Not 1 | 0.47 |
| TOTAL-N | % of DM | 2.9 | 3.3 |
| PHOSPHATE-P | Note 2 | | Note 2 |
| From stabilised sludge | Dewatered sludge | | Filtered liquid |
| E. COLI | per 100 ml | 790 000 | 800 AMMONIUM-N |
| | % of DM | 0.08 | 14 mg/l |
| NITRITE | % of DM | 0.03 | 15 mg/l |
| NITRATE | % of DM | 0.14 | 150 mg/l |
| TOTAL-N | % of DM | 2.5 | 180 mg/l |
| PHOSPHATE-P | | Note 2 | 0.15 mg/l |

Note 1: The analysis could not be made due to the constitution of the sample
Note 2: Could not be analysed

Example 3

A further experiment with sample from the same sewage plant as in example 1 and 2 was performed. The following results were obtained:

TABLE 3

| | Sludge | Dewatered sludge | Separated liquid |
|---|---|---|---|
| Dry matter | 2.4% | 7.3% | — |
| Total—P | 2.3% | 2.6% | 1.4 mg/l |

TABLE 3-continued

| | Sludge | Dewatered sludge | Separated liquid |
|---|---|---|---|
| $NO_2$—N | 17 mg/kg DM | 42 mg/kg DM | 0.68 mg/l |
| $NO_3$—N | 670 mg/kg DM | 52 mg/kg DM | 38 mg/l |
| $NH_4$—N | 280 mg/kg DM | 900 mg/kg DM | 21 mg/l |
| Total—N | 3.0% | 3.0% | 47 mg/l |

As is evident the nitrogen concentration has not been reduced.

Example 4

Leachate from a waste station (Forsbacka) was treated with the method and apparatus according to the invention. The following results were obtained.

| | | Metal mg/l | | | | |
|---|---|---|---|---|---|---|
| Sample No. | Tr. time/h | Cu | Zn | Fe | Mn | Ni |
| 0 | 0 | 0.67 | 0.68 | 34 | 3.4 | 0.064 |
| 1 | 1 | 0.03 | 0.70 | 24 | 3.2 | 0.033 |
| 2 | 24 | 0.03 | 0.26 | 18 | 0.73 | 0.035 |
| Reduction (%): | | 96 | 62 | 47 | 79 | 35 |

As is evident from this table a significant reduction of metal contents is achieved.

Example 5

Pigs manure from a pig stable was placed in a tank of 0.3 $m^3$, and was exposed to the same treatment as the sludge in example 1. This manure contained large portions of urine and straw. The very strong smell (ammonia) was reduced after 36 hours to stable and straw smell. After the process had been started the temperature exceeded the ambient temperature by 25–30° C.

Example 6

The product obtained after treatment of sludge is sedimented and the sediment is separated. After drying it is used as earth improver for the growing of tomatoes. In comparison with tomatoes that have not obtained earth improver, one can observe a marked difference in growth power.

Example 7

Supernatant from the sedimentation experiment in Example 1 contains nitrogen bound in the form of $NO_3$ which renders it usable as manure water for the growth of potatoes, tomatoes, flax etc.

An important observation is that the temperature of the medium during treatment according to the invention is of importance for the final product. It has turned out that the temperature should be between 10 and 25° C. It can be noted that the optimal temperature for oxygenating water is 22° C.

Therefore, it is preferred that the medium to be treated be taken directly from the process in which it is generated, such as paper pulp production, chemical process liquids etc.

What is claimed is:

1. An apparatus for the treatment of contaminated media, the apparatus comprising:
   a rotatable housing having at least one inlet for gas and at least one suction opening for the medium to be treated;
   a number of outlet openings arranged along a periphery of the housing;

a number of vanes arranged in the outlet openings;

a shaft connected to the housing and connectable to a device for causing rotation of the housing; and wherein the housing comprises at least one compartment, the at least one compartment being essentially shaped as a truncated cone, the at least one suction opening for the medium to be treated being at the apex of the cone and the outlet openings being at the base thereof.

2. The apparatus according to claim 1, wherein:

the housing comprises an upper compartment with a corresponding upper suction opening and a lower compartment with a corresponding lower suction opening;

the upper compartment and the lower compartment are separated by a plate; and the plurality of outlet openings provided along the periphery of the housing belong to the upper and the lower compartments, respectively, at an opposite end thereof with respect to a corresponding suction opening.

3. The apparatus according to claim 1, wherein the housing comprises:

a single compartment having the shape of a truncated cone with the apex facing downwards and having a suction opening at the apex of the cone;

a plate forming the base of the cone and closing the compartment; and wherein the gas inlet exits through the plate.

4. The apparatus according to claim 1, wherein the housing comprises:

a single compartment having the shape of a truncated cone with the apex facing upwards and having a suction opening at the apex of the cone;

a plate forming the base of the cone and closing the compartment; and wherein the gas inlet exits through the plate.

5. The apparatus according to claim 2 or 4, wherein the upper suction opening has the shape of an annular gap.

6. The apparatus according to claim 1, wherein the vanes are arranged such that the vanes extend from the periphery of the housing and a distance inward towards the center of the apparatus and form an angle with an imagined line running from an outermost point of attachment for respective vane and through the center of the apparatus.

7. The apparatus according to claim 1, wherein the shaft is attached to the plate in the center thereof.

8. The apparatus according to claim 1, wherein the shaft is hollow and connected to a gas source via a throttle valve for supplying gas to the inner of the apparatus via an opening in an end of the shaft.

9. A method of treatment of a contaminated medium containing organic material, the method comprising:

providing a rotatable cone-shaped housing having an inlet and an outlet for the medium to be treated;

immersing the housing in the medium to be treated;

rotating the housing such that a vortex is generated therein; and supplying gas to the center of the vortex.

10. The method according to claim 9, wherein the medium has a high concentration of bacteria.

11. The method according to claim 10, wherein the bacteria comprises *E. coli*.

12. The method according to claim 9, wherein the medium comprises manure, waste water sludge, and leak water from waste deposits.

13. The method according to claim 9, wherein the speed of rotation of the housing is 500–3500 rpm.

14. The method according to claim 13, wherein the speed of rotation of the housing is 800–2800 rpm.

15. The method according to claim 9, wherein the gas is air.

16. The method according to claim 9, wherein the gas is ozone.

17. The method according to claim 9, wherein an apparatus according to claim 1 is used.

* * * * *